A. Northrop,
Milk Cooler.
No. 113,690.   Patented Apr. 11, 1871.

Witnesses:
Thos. Wagner
Eugene C. Adams

Inventor:
Albert Northrop.
by his Attorneys
Johnson, Klaucke & Co.

United States Patent Office.

ALBERT NORTHROP, OF ELYRIA, OHIO.

Letters Patent No. 113,690, dated April 11, 1871.

IMPROVEMENT IN MILK-COOLERS.

The Schedule referred to in these Letters Patent and making part of the same.

I, ALBERT NORTHROP, of Elyria, in the county of Lorain and State of Ohio, have invented a new and useful Improvement in Apparatus for Cooling Milk and other liquids, which I denominate the "Automatic Agitating Cooler," of which the following is a specification.

My invention relates to devices for cooling milk in order to prevent it from souring, and for agitating it to prevent the cream from rising to the surface of the milk, or separating therefrom.

It is well known that milk when kept at a cool temperature will keep pure a longer time, and that when the cream is once separated from the milk it will not again unite with it, and the richness which it imparts to the cheese is thereby lost, because the cream, after being once separated, unites with and passes off with the whey, and does not enter into the curd from which the cheese is made.

It is important to overcome these disadvantages, especially in the manufacture of cheese, and they are entirely obviated by my invention, which consists in providing a can or other suitable receptacle, with an upright tube having its bearing therein, with two or more agitating-tubes communicating therewith and inclosing a central tube communicating with two or more propelling-tubes, arranged so that their issues revolve adjacent to the outside surface of the can or receptacle for the purpose of—

First, producing a circulation of cold water through the vertical tube and its branches in order to reduce the milk or other liquid to the proper temperature; and Second, for forming an outlet through the central tubes and propelling-arms for said cooling element, in order to produce an automatic revolving motion of the said agitators, and utilize the discharging water to cool the exterior of the can.

My invention also consists in the employment of a covering, for the can or receptacle, of felt or other suitable absorbent of water, in connection with the automatic revolving water-spraying issues, for the purpose of holding the discharging currents of cold water around the exterior of the can so as to form an inclosing cold armor.

In the accompanying drawing—

The can or vessel A may be of any suitable construction, and may have a lid or cover, B; but I prefer an open or skeleton top.

A vertical tube, C, passes through an opening in the lid, and is stepped into the bottom of the can at $a$, so as to be revolved freely therein.

The portion of this tube C within the vessel is provided with two or more agitating-tubes D, which communicate with the vertical tube C, at their upper and lower ends, for a purpose to be presently described.

Within the vertical tube C I arrange another tube, E, having a packing, $b$, at its lower end, which extends just below the upper ends of the agitating-tubes and closes and divides the annular chamber $c$ between the inner and outer tubes, but leaves open the communication of the central tube with that portion of the tube C below the packing, so that the outer tube C shall only communicate with the agitating-tubes D below the packing $b$.

The upper end of the central tube E extends above the cover B of the can, and forms a communication with two or more discharging-tubes F, the issues $d$ of which are curved in opposite directions and arranged contiguous to the outside of the can, near the top thereof, so as to discharge the water, after it has circulated through the outer tube, its connected agitators D, and the inner tube, directly against the exterior surface of the can.

For the purpose of utilizing the cold discharging streams of water to cool the can I inclose the latter with a jacket, G, of felt or other absorbent of water, so as to catch and absorb the discharging water and form a wet body by which the water is held, and through which it soaks down in contact with the surface of the can, thereby forming a cold-inclosing cover, which permits of the employment of the waste water to diminish the temperature of the can.

The vertical tube B may be jointed in any suitable manner above the cover of the can, to admit of its separation when it is desired to clean out the inner tube.

Figure 1:
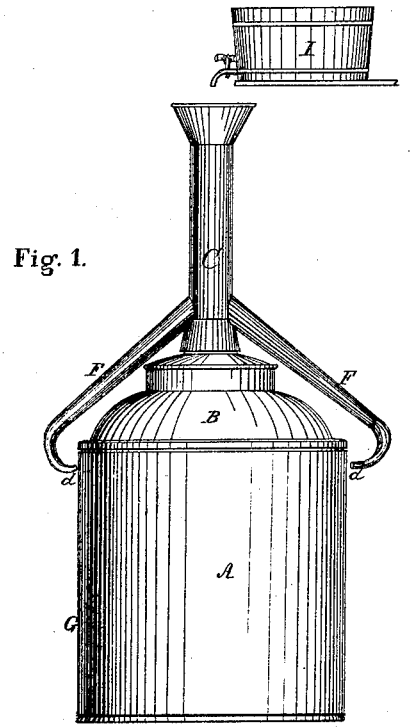
Figure 1 represents an elevation of a vessel for cooling and agitating milk, embracing my invention.
Figure 2:
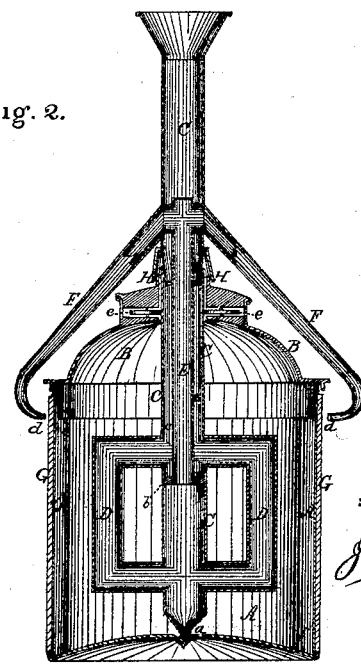
Figure 2 represents a vertical section of the same.

Such a joint is shown at H in fig. 2; and, in order to steady the upper end of the tube, the cover may be provided with anti-friction rollers $e$, fitted so as to bear against the circumference of tube C to lessen the friction and steady the revolving motion of the tube.

The upper end of the vertical tube C is made funnel-shaped, and the water enters therein from a supply-tank, I, provided with a spigot, and, passing down the vertical tube C through the agitating-tubes D, enters the former near its lower end, and rising therein passes through the inner tube E into and through the discharging-tubes F, and by its weight and the pressure of the head of water within the vertical tubes upon the oppositely-curved ends of the discharging-tubes F, causes them to revolve automatically so long as the supply of water lasts, and thus produces a continuous circulation of the cold water within and upon the exterior of the can, and, at the same time, employs that circulation to render the agitative action of the device automatic.

Instead of the anti-friction rollers in the cover of the can the vertical tubes may be centered by a pivot at its upper end in any convenient way.

The bearing of the revolving tube may be formed by a separate step soldered to the bottom of the can.

Instead of the cooling fluid circulating and discharging through both propelling-tubes the circulation may be changed so that one tube may discharge cold water on the outside of the can direct from the supply-tank, and the other the water after it has circulated through the agitating-arms.

Having described my invention,

I claim—

1. The combination of an interior tube or tubes and an exterior arm or tube, having free communication between them, to produce a circulation of the cooling liquid within and upon the exterior of the can, as described.

2. In combination with the vessel A the vertical supplying-tubes C with its tube D, and the central discharging-tube E, arranged to communicate with each other and to produce a circulation of cold water within said vessel, as described.

3. The combination of the vessel A, the vertical supplying-tube C, and the central discharging-tube E, with the discharging-arms F, having their issues arranged as shown for the purpose of discharging the waste water upon and against the sides of the vessel or can, for the purpose described.

4. The combination of the automatic propelling and discharging-arms F with the felt jacket G of the can, for the purpose as described.

ALBERT NORTHROP.

Witnesses:
A. E. H. JOHNSON,
J. W. HAMILTON JOHNSON.